United States Patent [19]

Ciemochowski

[11] 3,778,729
[45] Dec. 11, 1973

[54] VARIABLE CAPACITANCE CONTROLLED TRANSISTOR MULTIVIBRATOR PULSE GENERATOR FOR ENGINE FUEL METERING SYSTEM

[75] Inventor: Michael F. Ciemochowski, Warren, Mich.

[73] Assignee: Colt Industries Operating Corp., New York, N.Y.

[22] Filed: Dec. 20, 1971

[21] Appl. No.: 209,539

[52] U.S. Cl. ........... 331/65, 123/124 B, 123/180 E, 307/264, 307/265, 331/75, 331/113 R, 331/177 R
[51] Int. Cl. .................... F02m 51/00, H03b 3/04
[58] Field of Search ............... 331/65, 75, 113 R, 331/177 R, 177 V; 307/264, 265; 123/26, 120, 124 B, 180 E

[56] References Cited
UNITED STATES PATENTS

| | | |
|---|---|---|
| 3,048,719 | 8/1962 | Grigsby ........................ 331/113 R X |
| 3,614,651 | 10/1971 | Pasquier et al. ........................ 331/65 |
| 3,041,502 | 6/1962 | Foster ........................ 331/113 R X |

Primary Examiner—Roy Lake
Assistant Examiner—Siegfried H. Grimm
Attorney—Walter Potoroka, Sr.

[57] ABSTRACT

An internal combustion engine having an intake manifold has fuel supplied thereto by a fuel metering system which includes a variably positionable fuel metering valve positioned in accordance with an electrical field generated by a coil energized in accordance with parameters of engine operation; transducer means connected to the engine serves to modify and control the energization of the coil; the transducer means includes electrical circuitry having a pulse generating section, an amplifying section and an output section and further includes a pressure responsive member responsive to the pressure within the intake manifold and effective for varying the value of variable capacitance means which in turn modulates the circuit constants of the electrical circuitry in a way as to cause a corresponding variable output of the output section.

1 Claim, 6 Drawing Figures

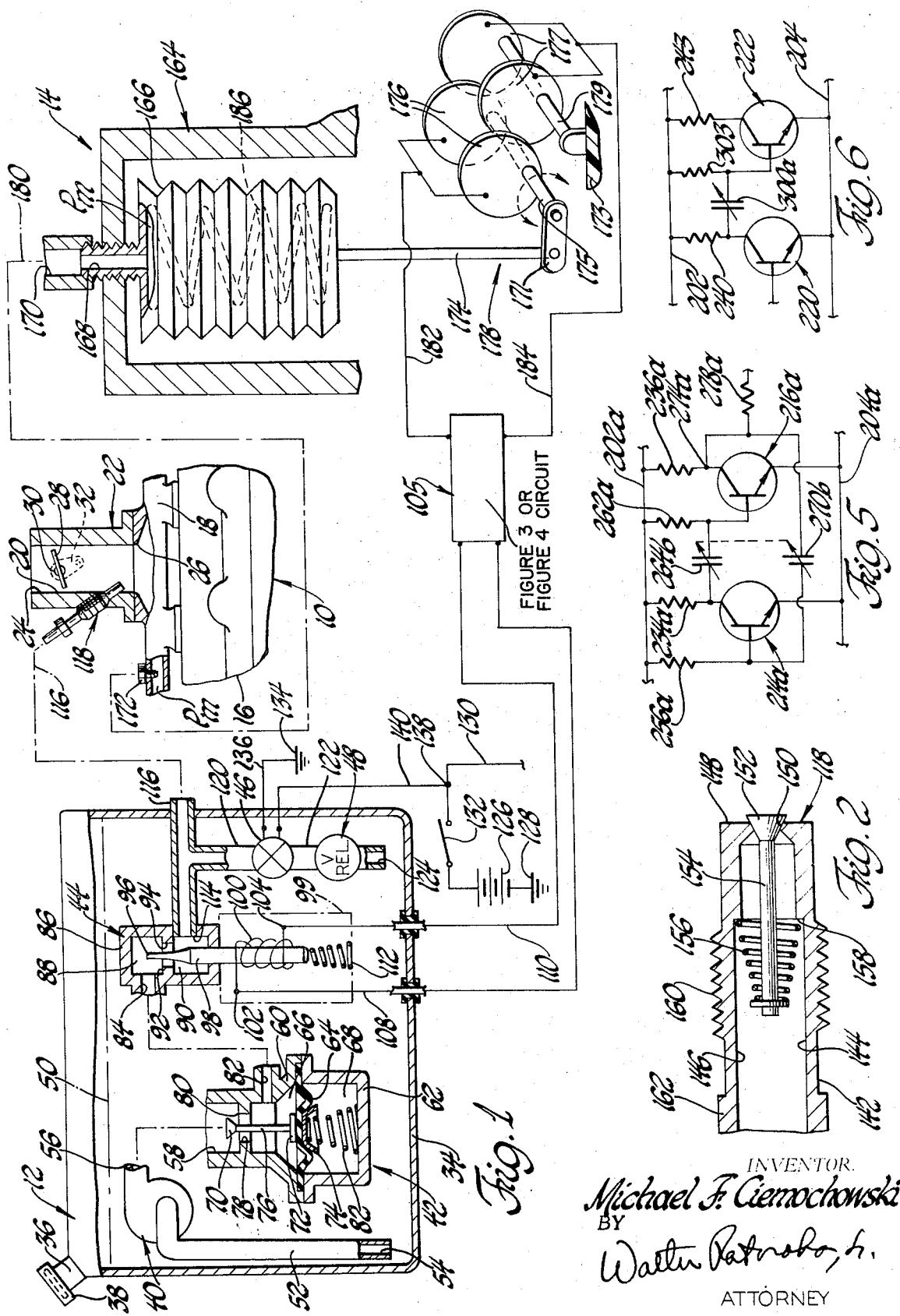

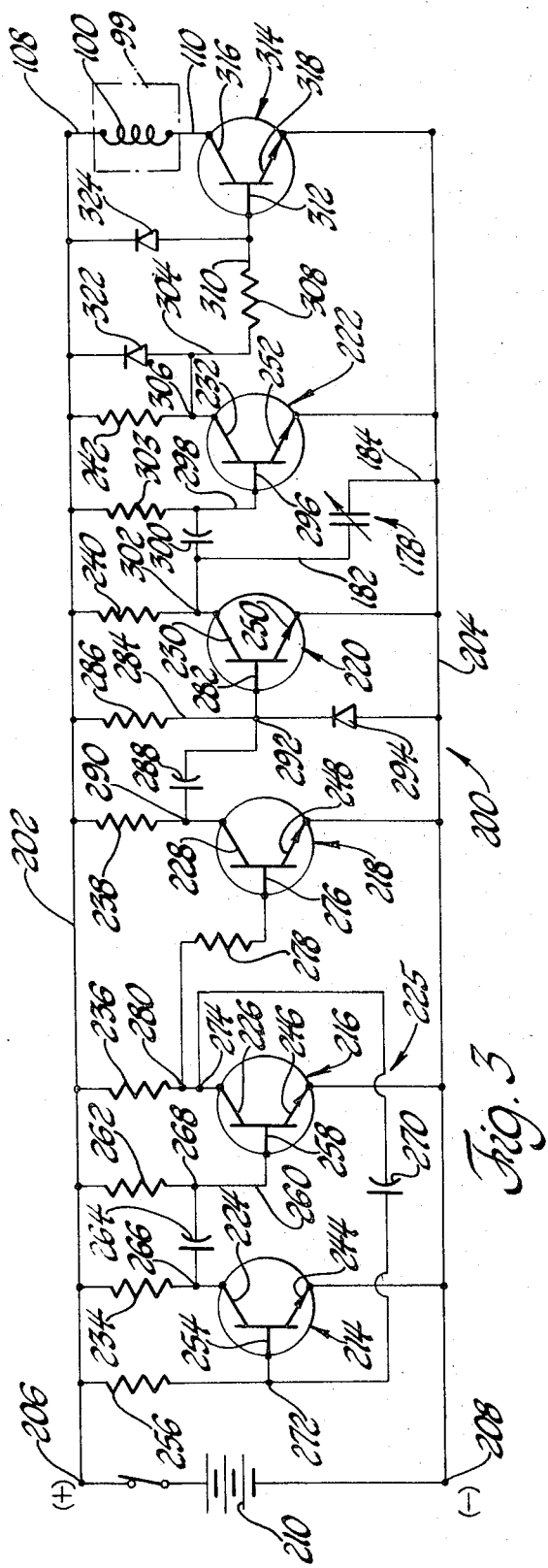
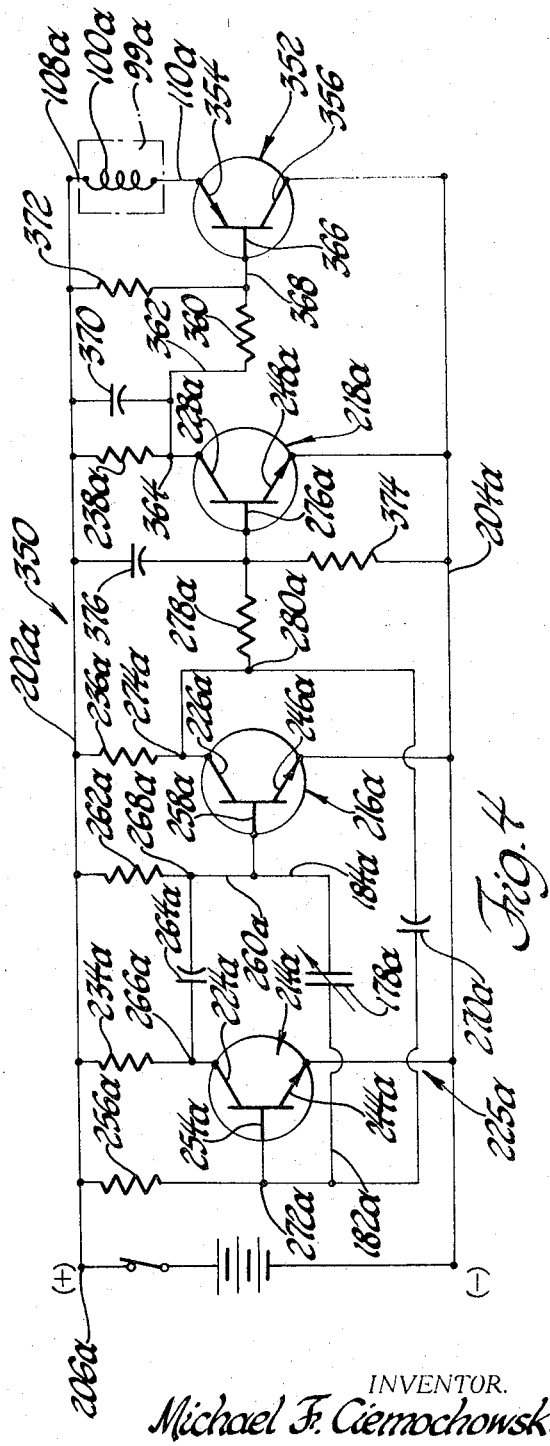

VARIABLE CAPACITANCE CONTROLLED TRANSISTOR MULTIVIBRATOR PULSE GENERATOR FOR ENGINE FUEL METERING SYSTEM

BACKGROUND OF THE INVENTION

Various transducer devices have, heretofore, been proposed by the prior art. However, many of these devices have been found difficult to calibrate, extremely sensitive to the occurrence of, for example, vibration and temperature variations as well as susceptible to loss of accuracy and calibration due to wear as occasioned, for example, by friction during use thereof.

Accordingly, the invention as herein disclosed and described is concerned with the solution of the above as well as other related problems.

SUMMARY OF THE INVENTION

An electric circuit according to the invention comprises first means for generating a timed intermittent electrical pulse signal, second output switch means operatively connected to an associated load, said second output switch means being effective to at times become closed and apply electrical energy to said electrical load generally in timed relationship to said timed intermittent electrical pulse signal, and additional means responsive to an operating parameter of an associated apparatus for varying the length of time that said second output switch means is closed in accordance with said operating parameter.

Various general and specific objects and advantages of the invention will become apparent when reference is made to the following detailed description of the invention considered in conjunction with the accompanying drawings.

DESCRIPTION OF THE DRAWINGS

In the drawings, where for purposes of clarity certain details or elements may be omitted from one or more views:

FIG. 1 is a somewhat schematic view of an engine fuel supply system embodying the invention;

FIG. 2 is an enlarged axial cross-sectional view of the fuel delivery nozzle of FIG. 1;

FIG. 3 is a schematic wiring diagram of circuitry employable within the environment of FIG. 1;

FIG. 4 is a schematic wiring diagram of other circuitry employable within the environment of FIG. 1;

FIG. 5 is a fragmentary portion of a schematic wiring diagram illustrating a modification of the circuitry of FIG. 4; and FIG. 6 is a fragmentary portion of a schematic wiring diagram illustrating a modification of the circuitry of FIG. 3.

DESCRIPTION OF PREFERRED EMBODIMENTS

Referring now in greater detail to the drawings, FIG. 1 illustrates a vehicular internal combustion engine 10, as well as a sensing and control device or apparatus 14 for sensing the engine demands for fuel flow and, in response thereto, producing an output control signal for causing the corresponding rate of fuel flow to said engine.

As generally depicted, the engine 10 may be comprised of an engine block 16, an intake or induction manifold 18 leading to the inlet valves associated with the pistons and cylinders within the engine block 16, and an air induction passage 20, formed within a device 22, serving to communicate atmospheric air from its intake end 24 to the inlet 26 of the manifold 18. As shown, a throttle valve 28, pivotally carried by a variably rotatably positioned throttle shaft 30, is situated within the induction passage means 20 so as to variably control the rate of air flow therethrough in accordance with operator demands. A throttle actuating lever 32 may be secured to the throttle shaft 30 and operatively connected to suitable control linkage as, for example, the usual operator foot-operated throttle pedal situated as within the passenger compartment of the related vehicle.

The fuel tank 12 may be comprised of a general housing 34, provided with a filler tube 36 and a closure cap 38, containing therein a fuel pump assembly 40 (which may be electrically driven), a pressure regulator assembly 42, a main metering valve assembly 44, an on-off type solenoid operated valve assembly 46 and a pressure relief valve assembly 48. As generally depicted, all of the elements may be submerged within the fuel 50 contained in tank housing 34.

As shown, an intake conduit 52, having an open lower end 54, is connected to the inlet in pump assembly 40 which serves to pump such fuel at an elevated pressure through the pump discharge conduit 56 to the inlet conduit portion 58 of the pressure regulator assembly 42.

The regulator assembly 42 may be comprised of housing sections 60 and 62 which peripherally retain therebetween a pressure responsive movable diaphragm 64 which defines two distinct but generally variable chambers 66 and 68. A valve member 70, secured to the diaphragm 64 as by diaphragm plates 74 and 72, has its stem portion 76 passing through the aperture 78 about which is formed an annular valve seat 80. A compression spring 82, situated within chamber 68, normally urges diaphragm 64 upwardly so as to move valve member 70 away from valve seat 80 in order to open the orifice 78. An outlet 82 communicates with the chamber 66 and serves to direct fuel flow to the inlet conduit portion 84 of the metering valve assembly 44.

The metering valve assembly 44 may be comprised of a housing 86 having formed therein chambers 88 and 90 between which is situated a wall portion 92 provided with a metering orifice 94 formed therethrough. A contoured metering valve portion 96, operatively carried and actuated or positioned as by the armature 98 of a solenoid assembly 99, coacts with the metering orifice 94 in order to determine proper effective flow areas therebetween for achieving the desired rate of fuel flow therethrough. As shown, the solenoid assembly 99, in addition to armature 98, has a winding or field coil 100 having first and second terminals 102 and 104 respectively connected to the circuitry 105 comprising or associated with the sensor 14. Suitable spring means 112 may be provided to normally urge the armature 98 and valve member 96 upwardly thereby tending to more nearly completely close the effective flow area through metering orifice 94.

One end 114 of an outlet conduit 116 is connected to housing 86 so as to be in communication with chamber 90 while its other end is connected to the inlet end of a metered fuel discharge valve assembly 118 which may be threadably carried by the housing of induction device 22, as shown in FIG. 1, so as to have the discharge end thereof in position for discharging metered fuel into the induction passage 20.

A branch conduit 120 serves to connect the inlet of the solenoid operated valve assembly 46 to conduit 116; the outlet of valve assembly 46 is connected, via conduit 122, to the inlet of the pressure relief valve assembly 48 while the output thereof is open to the interior of the fuel tank housing 34 via conduit 124.

A suitable source of electrical potential 126 has one of its terminals at ground potential, as at 128, while its other terminal is connected to electrical conductor means 130 leading as to, for example, the associated vehicular ignition system (not shown but well known in the art). A conventional key-operated ignition switch 132 may be serially situated in conductor 130. Further, as illustrated, one terminal of the solenoid valve assembly 46 is connected to ground 134 by means of a conductor 136 while its second terminal is connected to conductor 130, at a point 138, as by a second conductor 140. As a consequence of such electrical connections, whenever switch 132 is closed solenoid valve assembly 46 is energized thereby terminating all fluid flow therethrough; whenever switch 132 is open, as shown, solenoid valve assembly 46 is in a de-energized state permitting free flow of fluid therethrough from conduit 120 to conduit 122.

Although the fuel discharge valve means may take any suitable form and may in fact be comprised of a plurality of individual valves communicating with the engine induction system at spaced points of discharge, the fuel discharge valve assembly 118, for purposes of illustration, may be comprised of a suitable outer body or housing 142 with an internal passage means 144 having generally an inlet end 146 (for coupling to conduit 116) and an outlet end 148. A discharge aperture 150 is normally closed as by end 152 of a spring-loaded pintle 154 the other end of which is operatively connected to a compression spring 156 seated against an internal shoulder 158. An externally formed threaded portion 160 is provided for operative engagement with, for example, the body of air induction device 22. A suitable tool-engaging surface 162 may also be provided for enabling the threadable engagement and disengagement of the valve assembly 118 with respect to the related supporting structure.

The sensing and control apparatus 14 is illustrated as being comprised of suitable supporting structure 164 having the upper end of a bellows assembly 166 operatively secured thereto as by an upwardly extending externally threaded conduit portion 168 which, as illustrated is operatively connected to and placed in communication with one end of suitable conduit means 170 which, in turn, communicates with the interior of the intake manifold 18 as by suitable connecting means 172.

The lower end of bellows 166 is operatively connected, as by suitable linkage means 174, to variable capacitance means 178, which, as schematically shown, may be comprised of a plurality of relatively movable capacitor plates 176 carried by a common rotatable member 175 which carries a lever arm 171 fixed thereto and pivotally connected to linkage 174. Cooperating fixed plates 177 may be carried as by a common member 179 and supported against movement as on a suitable support 173. The variable capacitance means is, in turn, electrically connected via conductor means 182 and 184 to the related circuitry 105.

The pressure responsive means or bellows 166 may inherently have resilience which under set conditions causes the bellows 166 to assume positions as shown and which also resiliently resists the upward movement of the lower end of the bellows due to an increase in the pressure differential thereacross. However, as should be evident, if need be or if desired, separate resilient means such as for example, the compression spring 186 shown within the bellows 166 may be employed.

Referring now in greater detail to FIG. 3, the circuit means 200, employable generally as the circuitry diagrammatically includes at 105 of FIG. 1, is illustrated as comprising first and second main conductor means 202 and 204 which may, in turn, have terminals 206 and 208 adapted for connection to a suitable source of electrical potential 210. A plurality of transistors 214, 216, 218, 220 and 222 have their collector electrodes 224, 226, 228, 230 and 232 electrically connected to conductor 202 through resistors 234, 236, 238, 240 and 242, respectively, while the emitter electrodes 244, 246, 248, 250 and 252 thereof are resepctively connected to ground conductor 204.

Base terminal or electrode 254 of transistor 214 is connected to the positive conductor 202 through a resistor 256. Similarly, base 258 of transistor 216 is connected to conductor 202 via conductor means 260 and series resistor 262. A first capacitor 264 is situated as to have one side thereof electrically connected to collector 244 as at a point 266 electrically at the juncture of resistor 234 and collector 224. The other side of capacitor 264 is connected as at 268 to conductor means 260 so as to be electrically between resistor 262 and base terminal 258 of transistor 216. A second capacitor 270 has a first side thereof electrically connected to base 254 and resistor 256 as at 272 while its other side is connected to the electrical junction of collector 226, of transistor 216, and resistor 236 as at 274. Base terminal 276 of transistor 218 is also connected, through series resistance means 278, to the junction of collector 226 and resistor 236 as at 280.

Base terminal 282 of transistor 220 is connected to positive conductor 202 via conductor means 284 and resistor 286. A capacitor 288 is arranged to have its one side connected to the electrical juncture of resistor 238 and collector 228 as at 290 while its other side is connected to conductor means 284 at a point 292 between resistor 286 and base 282; as shown, a diode 294 is connected between conductor 284 and negative conductor means 204.

Transistor 222 has its base terminal 296 connected, via conductor means 298, with one side of a capacitor 300 which has its other side connected to the junction between resistor 240 and collector 230 as at 302. A resistor 303 is also connected generally electrically across conductor 202 and base terminal 396 of transistor 222.

A conductor portion 304 connected at one end at a point 306 electrically between resistor 242 and collector 232 is in turn connected to a resistor 308 the other end of which is connected, via conductor means 310, to a base terminal 312 of an output transistor 314 which has its emitter 318 connected to the negative potential of conductor 204 and its collector 316 connected, as by conductor means 110, to one end of the metering valve field coil means 100. The other end of coil 100 is connected to conductor means 202 as by conductor means 108. (Also see FIG. 1.) A diode 322 is connected between conductors 304 and 202 while a diode 324 is connected across conductors 202 and 310. Such diodes 322 and 324 are provided primarily as means for temperature compensation.

The variable capacitance means 178 is illustrated as being connected to the negative potential of conductor 204 as through conductor means 184 while conductor means 182 electrically connects the other end of means 178 to, in effect, the electrical junction 302.

In FIG. 4, circuitry of a second embodiment of the invention (also employable as the circuitry disgrammatically illustrated at 105 of FIG. 1), all elements which are like or similar to those of FIG. 3 are identified with a like reference number provided with a suffix "a." In the circuit means 350, an output transistor 352, of the P-N-P type, has its collector 356 connected to the negative potential of conductor 204a while its emitter 354 is connected, by means of conductor 110a, to one end of actuating coil 100a the other end of which is connected to the positive potential of conductor means 202a as by conductor 108a. A resistor 360 has its one end connected, via conductor means 362, to the electrical junction of resistor 238a and collector 228a as at 364 while its other end is connected to base electrode 366 of transistor 352 as by conductor means 368. A capacitor 370 is connected as to be electrically across conductors 202a and 362 while a resistor 372 is placed across conductors 202a and 368. Similarly, base 276a of transistor 218a is electrically connected to both one end of a resistor 374, having its other end connected to conductor 204a, and one side of a capacitor 376 which has its other electrical side connected to the positive potential of conductor means 202a.

In this embodiment, the variable capacitance means 178a is electrically connected to base 254a via conductor means 182a and to base 258a via conductor means 184a.

OPERATION OF THE INVENTION

Before considering the overall operation of the structure of FIG. 1, the operations of the circuitry shown by FIGS. 3 and 4 will be discussed.

The operation of circuitry 200 of FIG. 3 is generally as follows. Since all of the transistors employed in FIG. 3 are of the N-P-N type, the emitters of the transistors must be negative with respect to their respective bases before conduction will occur through the respective collectors and emitters.

When the circuitry of FIG. 3 is energized, current flows from conductor 202 through resistor 256, base 254 and emitter 244 to negative or ground potential or conductor 204. The current flow through the base 254 emitter 244 causes transistor 214 to turn "on" or become conductive through the collector 224 emitter 244 circuit thereof which, in turn, causes point 266 to be brought to negative potential thereby also placing the left side of capacitor 264 to be placed at the same negative potential.

Consequently, current flow also occurs through resistor 262 and capacitor 264 causing the capacitor 264 to eventually become charged so that its left side is negative (−) and its right side is positive (+). During the time that capacitor 264 is being thusly charged, there is an insufficient voltage across the base 258 to emitter 246 diode of transistor 216 to result in any current flow therethrough. Therefore, until such time as when capacitor 264 attains a predetermined charge, transistor 216 is held "off" or in a non-conductive state.

When capacitor 264 becomes sufficiently charged, the base 258 emitter 246 circuit starts to conduct thereby placing transistor 216 in an "on" or conductive state. Consequently, point 274, previously at positive potential, is now brought to the negative potential of conductor 204 through emitter 264 and collector 226. It should be remembered that when transistor 216 was initially "off" current flow also experienced through resistor 236, point 274, capacitor 270 and base-emitter of transistor 214 thereby charging capacitor to a condition wherein the right side thereof was at positive (+) potential and the left side thereof was at negative (−) potential. Therefore, when transistor 216 is first switched "on," the charge previously placed on capacitor 270 is first removed and then the capacitor 270 starts to become charged in the opposite direction by current flow through resistor 256, capacitor 270, collector 226 and emitter 246 so that the left side thereof is at a positive (+) potential while the right side thereof is a negative (−) potential.

During the time that capacitor 270 is thusly being charged there is insufficient voltage across the base 254 emitter 244 of transistor 214 to maintain it conductive thereby placing transistor 214 in an "off" state. Similarly to transistor 216, when capacitor 270 becomes sufficiently charged, transistor 214 is again made conductive. Further, just as capacitor 270 was charged negative-positive (left to right) when transistor 216 was "off" so does capacitor 264 become charged positive-negative (left to right) when transistor 214 is "off."

Accordingly, it can be seen that the charging time of capacitor 270, of positive (+) left to negative (−) right, determines the length of time that transistor 214 is held "off" and that the charging time of capacitor 264, of negative (−) left to positive (+) right, determines the length of time that transistor 216 is held "off." Further, the charging time of capacitor 270 is dependent upon resistor 256 while the charging time of capacitor 264 is dependent upon resistor 262.

In view of the preceding it can be seen that transistors 214 and 216 along with the related resistance and capacitance means define electrical pulse generating means 225 and, in the particular embodiment shown, comprise an astable or free running multivibrator having a fixed cycle time as well as fixed "on" and "off" times for the transistors 214 and 216. Accordingly, every time transistor 216 is turned "off" a positive (+) voltage pulse is developed across the collector 226 and emitter 246 thereof. The effective width of such a positive pulse, in the sense of time or duration thereof, is dependent on and determined by the "off" time of transistor 216.

Whenever transistor 216 is turned "off" as described above, point 280 is brought back to positive potential thereby resulting in current flow through resistor 236, point 280, resistor 278, base 276 and emitter 248 of transistor 218 to negative or ground potential of conductor 204 and in so doing, causing transistor 218 to be turned "on" with current flow resulting through collector 228 and emitter 248.

As a consequence of transistor 218 being thusly turned "on," point 290 is effectively brought down to negative potential causing current flow through resistor 286, point 292 and capacitor 288 resulting in the charging of capacitor 288. During the time that capacitor 288 is charging, the voltage available across the base-emitter diode of transistor 220 is insufficient to cause conduction therethrough thereby maintaining transistor 220 in an "off" state. During this time the capacitor 228 is charging to be negative on its left side and positive on its right side.

Transistor 218 will, of course, remain "on" for as long as the positive pulse is generated at the collector 226 of transistor 216 or, in other words, when transistor 216 is "off" transistor 218 is "on."

It should be made clear that when transistor 218 was "off" before it was turned "on," capacitor 288 was charged as to be positive on its left side and negative on its right side so that, upon transistor 218 being turned "on," such charge is removed before capacitor 288 starts being charged in the oposite direction. In the preferred form of the circuitry of FIG. 3, the charging time of capacitor 288 (when charging negative on the left and positive on the right) to a value sufficient to turn transistor 220 "on" is greater than the "on" time of transistor 218. The diode 294 is provided in order to protect the emitter-base diode of transistor 220 which might otherwise become damaged in the event the capacitor 288 should for some reason become charged to an excessive value.

In any event, when transistor 218 is turned "off," by virtue of transistor 216 being turned "on," current flow occurs through resistors 286 and 238, capacitor 288, base 282 and emitter 250 of transistor 220 thereby turning transistor 220 "on" so as to complete a circuit through collector 230 and emitter 250 thereof. When transistor 220 is thusly turned "on," point 302 is brought to negative potential thereby resulting in current flow through resistor 303, capacitor 300, collector 230 and emitter 250 causing the capacitor 300 to undergo reverse charging so that the left side thereof is at negative potential while the right side is at positive potential. During this time of charging, the available voltage across the base-emitter diode of transistor 222 is insufficient to cause conduction therethrough with the result that transistor 222 is held "off." However, when transistor 220 is turned "off," point 302 is brought back to positive potential thereby resulting in current flow through resistor 240, capacitor 300, base 296 and emitter 252 of transistor 222 thereby causing transistor 222 to be turned "on" with the completion of a circuit through the collector 232 and emitter 252 thereof. In additiona, part of the current flow through resistor 240 and point 302 flows through the variable capacitance means 178 thereby, in effect, creating a parallel path with the capacitor 300.

For the moment, neglecting the effect of the capacitance means 178, and in further detail considering the related operations of transistors 220 and 222, it can be seen that at the moment that transistor 220 is switched from "off" to "on," capacitor 300 had attained some value of initial charge of positive to negative from left to right. Further, as transistor 220 is switched from "off" to "on" the forward bias on the base 296 emitter 252 is removed and then capacitor 300 discharges the said initial value of the charge previously placed thereon before the capacitor starts charging in the reverse direction. With the removal of the forward bias on transistor 222 and the discharging of the initial charge on capacitor 300, transistor 222 is turned "off." The length of time that transistor 222 is thusly held "off" is determined by the length of time that it takes for capacitor 300 to discharge its initial charge plus the time that it takes for capacitor 300 to be charged, in the reverse direction (that is, left negative and right positive), to a value sufficient to again forwardly bias the transistor 222 into conduction. Without the presence of variable capacitance means 178 such "on" and "off" times would be maintained substantially stable based on the R-C time constants. However, the presence of the capacitance means 178 enables the controlled variation of the "off" time of transistor 222.

In view of the above, it can be seen that the value of the charge placed on capacitor 300 during the period that transistor 220 is "off" can be varied by the degree of current flow through and the effective capacitance of the variable capacitor means 178. That is, with respect to a particular selected length of time, capacitor 300 will be charged to a higher value when the value of capacitance of capacitor means 178 is low than when the value of capacitance is high. Further, the greater the value of the charge placed on capacitor 300 (during the time that transistor 220 is "off") the longer will transistor 222 stay "off" thereby increasing the width, time wise, of the positive pulse generated as at point 306

Whenever transistor 222 is turned "off," point 306 is brought to positive potential causing current flow through base 312 and emitter 318 of transistor 314 thereby biasing transistor 314 into conduction and completing the circuit through collector 316 and emitter 318 thereby energizing fuel valve field winding 100. As previously indicated, energization of coil 100 causes opening movement of fuel metering valve 98 thereby metering fuel flow to the engine 10.

Transistor 314 will remain "on" for as long as transistor 222 remains "off." Therefore, it should be apparent that as the "off" time of transistor 222 increases, as described above, the "on" time of transistor 314 increases thereby maintaining the fuel valve in an energized state for an increased rate of metered fuel flow per cycle of the pulse producing or generating means 225.

In view of the preceding and considering the circuitry of FIG. 3 within the overall environment of the structure of FIG. 1, it can be seen that as the throttle valve 28 is, for example, moved toward a closed position, the manifold vacuum, $P_m$, within manifold 18 increases causing pressure responsive means or bellows 166 to start to collapse (shorten in overall length) thereby to some corresponding degree rotating the movable capacitor plates 176 into a more juxtaposed relationship with fixed capacitor plates 177 thereby increasing the value of capacitance of capacitor means 178. This, as previously described, decreases the time width of the energizing pulse applied to actuating coil 100 via conductors 108 and 110 ultimately resulting fuel metering valve 98 being held away from orifice 94 a lesser time and therefore effectively providing a correspondingly decreased rate of metered fuel flow to the engine to accommodate the reduced demand for engine power.

The embodiment of FIG. 4 is in part somewhat similar to that of FIG. 3. All elements which are like and have identical or similar functions and operations to those of FIG. 3 are identified with like reference numbers provided with a suffix "a." The detailed mode of operation of such elements will therefore not be repeated.

For the moment neglecting the effect of variable capacitance means 178a, it can be seen that when transistor 216a is "off" that transistor 218a is "on" and that therefore point 364 is at negative potential causing transistor 352, which is a P-N-P type, to become conductive through the emitter 354 and collector 356 thereof thereby energizing the field winding 100a of fuel metering valve actuating assembly 99a. Capacitors 370 and 376 are primarily provided for electrical noise and line voltage spike suppression. Similarly, when transistor 216a is "on" transistor 218a is "off" as is the output signal transistor 352.

The oscillator or multivibrator means 255a has its cycle times determined by capacitors 264a and 270a along with the related resistors as described with reference to the oscillator means 255 of FIG. 3. However, the ultimate objective still is to obtain a variable "on" time of transistor 352 even though the remaining circuitry is one which is basically of a fixed cycle time.

This is accomplished by employing the variable capacitance means 178a in the manner shown. That is, one side of the capacitance means 178a is electrically connected to base 254a of transistor 214a via conductor means 182a while the other side is electrically connected to the base 258a of transistor 216a. As will be seen, the use of such a variable capacitance means enables the controlled variation of the frequency of the oscillator means 255a.

Keeping in mind the operation of the oscillator or multivibrator means 225, described in detail with reference to FIG. 3, and knowing that the various elements of FIG. 4 which are identified with like reference numbers provided with a suffix "a" function in the same manner, it can be seen that when transistor 214a is "off" and capacitor 270a is charging left to right, positive to negative, a second current path for the current flowing through resistor 256a is provided by the variable capacitance means 178a. As the value of the capacitance of means 178a increases the greater will be the current flow through the capacitor means 178a and therefore the greater will be the time required to charge capacitor 270a to a value sufficient to turn transistor 214a "on" again which, of course, in turn causes transistor 216a to turn "off."

Similarly, when transistor 216a is "off" and capacitor 264a is charging right to left, positive to negative, variable capacitor means 178a again provides a second or parallel path for current flow of some of the current flowing through resistor 262a. Accordingly, as the value of the variable capacitance increases the greater, per unit of time, will be the current flow through means 178a and therefore the greater will be the time required to charge capacitor 264a to a value sufficient to turn transistor 214a "on" again which, of course, in turn causes transistor 214a to turn "off."

Therefore, if the circuitry of FIG. 4 is placed within the environment of FIG. 1 as at 105, then it becomes apparent that as the throttle valve 28 moves toward a closed position, the vacuum, $P_m$, within manifold 18 increases causing pressure responsive means or bellows 166 to start to collapse (shorten in overall length) thereby to some corresponding degree rotating the movable capacitor plates 176 into a more juxtaposed relationship with fixed capacitor plates 177 thereby increasing the value of capacitance of capacitor means 178. This, in turn, causes the charging times of capacitors 264a and 270a to be lengthened, as previously described, resulting in a corresponding lengthening or extension of the cycle time of the oscillator means 225a or, in other words, a reduction in the frequency thereof. Consequently, per unit of time, a lesser quantity of metered fuel flow is delivered by the metering valve 98 which, of course, corresponds to the reduced fuel requirement of the engine 10 since, as assumed, the throttle valve 28 is being rotated toward its nominally closed or idle position.

FIG. 5 illustrates a further modification of the embodiment of FIG. 4. That is, the fragmentarily illustrated circuitry of FIG. 5 differs by not having the variable capacitance means 178a but, instead, employing ganged variable capacitors 264b and 270b respectively replacing capacitors 264a and 270a of FIG. 4. As should be apparent, the frequency of the oscillator of FIG. 5 would be controlled in the same manner, as that of FIG. 4, by having the ganged capacitors operatively connected to the bellows 166 in the way that capacitance means 178 and 178a was connected thereto.

FIG. 6 illustrates a further modification of the embodiment of FIG. 3. That is, the fragmentarily illustrated circuitry of FIG. 6 differs by not having the variable capacitance means 178 but, instead, employing a variable capacitor 300a replacing capacitor 300 of FIG. 3. As should be apparent, the width of the pulse would be controlled in the same manner, as that of FIG. 3, by having the variable capacitor 300a operatively connected to the bellows 166 in the way that capacitance means 178 was connected thereto.

Although only selected preferred embodiments and modifications of the invention have been disclosed and described it is apparent that other embodiments and modifications of the invention are possible within the scope of the appended claims.

I claim:

1. An electrical circuit particularly adapted for use with an internal combustion engine having an intake manifold supplied with fuel by a fuel metering system including a metering valve variably positioned in accordance with an electrical field energizing in accordance with an engine operating parameter, said circuit comprising means for generating a timed intermittent electrical pulse signal, output switch means operatively connected to an associated load, said output switch means being effective to at times become closed and apply electrical energy to said electrical load generally in timed relationship to said timed intermittent electrical pulse signal, and variable capacitor means responsive to a variable operating parameter of an associated apparatus for varying in accordance with said variable operating parameter, the length of time that said output switch means is closed, said means for generating a timed intermittent electrical pulse signal comprising a fixed frequency astable multivibrator comprising a first transistor having a first base electrode, a first collector electrode and a first emitter electrode, a second transistor having a second base electorde, a second collector electrode and a second emitter electrode, first conductor means electrically connected to the positive side of an associated source of electrical potential, second conductor means electrically connected to the negative side of said associated source, first resistance means interconnecting said first base electrode to said first conductor means, second resistance means interconnecting said first collector electrode to said first conductor means, third resistance means interconnecting said second base electrode to said first conductor means, fourth resistance means interconnecting said second collector electrode to said first conductor means, first circuit means interconnecting said first and second emitter electrodes to said second conductor means, first capacitor means interconnecting said first collector electrode to said second base electrode, second capacitor means interconnecting said first base electrode to said second collector electrode, and further comprising a third transistor having a third base electrode, a third collector electrode and a third emitter electrode, said third base electrode being electrically connected to said second collector electrode, said third emitter electrode being electrically connected to said second conductor means, and said third collector electrode being electrically connected to said first conductor means through fifth resistance means, a fourth transistor having a fourth base electrode, a fourth collector electrode and a fourth emitter electrode, third capacitor means electrically interconnecting said fourth base electrode to said third collector electrode, sixth resistance means electrically interconnecting said fourth collector electrode to said first conductor means, said fourth emitter electrode being electrically connected to said second conductor means, a fifth transistor having a fifth base electrode, a fifth collector electrode and a fifth emitter electrode, fourth capacitor means electrically interconnecting said fourth collector electrode and said fifth base electrode, seventh resistance means electrically connecting said fifth collector electrode to said first conductor means, said fifth emitter electrode being electrically connected to said second conductor means, said output switch means comprising a sixth transistor having a sixth base electrode, a sixth collector electrode and a sixth emitter electrode, said sixth base electrode being electrically connected to said fifth collector electrode, said sixth emitter electrode and said sixth collector electrode combining to define an output circuit including said associated load, and said variable capacitor means being electrically connected at one end to said fourth collector electrode and electrically connected at another end to said second conductor means.

* * * * *